US010502348B2

(12) United States Patent
Bjoerneklett et al.

(10) Patent No.: US 10,502,348 B2
(45) Date of Patent: Dec. 10, 2019

(54) RISER CONNECTOR ASSEMBLY

(71) Applicant: MARITIME PROMECO AS, Kristiansand (NO)

(72) Inventors: Boerge Bjoerneklett, Eiksmarka (NO); Per Martin Erik Hansson, Kullavik (SE); Stian Solberg, Drammen (NO)

(73) Assignee: MARITIME PROMECO AS, Kristiansand S (NO)

( * ) Notice: Subject to any disclaimer, the term of this patent is extended or adjusted under 35 U.S.C. 154(b) by 624 days.

(21) Appl. No.: 15/036,417

(22) PCT Filed: Nov. 14, 2014

(86) PCT No.: PCT/EP2014/074604
§ 371 (c)(1),
(2) Date: May 13, 2016

(87) PCT Pub. No.: WO2015/071411
PCT Pub. Date: May 21, 2015

(65) Prior Publication Data
US 2016/0258562 A1 Sep. 8, 2016

(30) Foreign Application Priority Data

Nov. 15, 2013 (NO) ...................................... 2013151

(51) Int. Cl.
*F16L 37/113* (2006.01)
*F16L 23/00* (2006.01)
(Continued)

(52) U.S. Cl.
CPC .............. *F16L 21/08* (2013.01); *E21B 17/01* (2013.01); *E21B 17/046* (2013.01);
(Continued)

(58) Field of Classification Search
CPC ......... F16L 21/08; F16L 23/003; F16L 37/113
(Continued)

(56) References Cited

U.S. PATENT DOCUMENTS

| 395,562 A | 1/1889 | Horatis |
| 3,501,173 A | 3/1970 | Petersen et al. |

(Continued)

FOREIGN PATENT DOCUMENTS

| CN | 1422372 A | 6/2003 |
| CN | 102333933 A | 1/2012 |

(Continued)

*Primary Examiner* — Anna M Momper
*Assistant Examiner* — Fannie C Kee
(74) *Attorney, Agent, or Firm* — Norman B. Thot

(57) ABSTRACT

A riser connector assembly includes a first connector assembly portion with first locking members, a second connector assembly portion with second locking members, and a locking device with third and fourth locking members. The locking device is rotatably connected to the first connector assembly portion. The locking device rotates between a first position where each of the locking members are interlocked, a second position where the first and third locking members are interlocked, and the second and fourth locking members are not interlocked, and a third position where none of the locking members are interlocked, so that the locking device is removable. The first and third locking members selectively/releasably interlock via a relative rotation between the first connector assembly portion and the locking device. The second and fourth locking members selectively/releasably interlock via a relative rotation between the second connector assembly portion and the locking device.

21 Claims, 15 Drawing Sheets

(51) Int. Cl.
*F16L 21/08* (2006.01)
*E21B 17/08* (2006.01)
*E21B 17/01* (2006.01)
*E21B 17/046* (2006.01)

(52) U.S. Cl.
CPC .......... *E21B 17/085* (2013.01); *F16L 23/003* (2013.01); *F16L 37/113* (2013.01); *F16L 2201/40* (2013.01)

(58) Field of Classification Search
USPC .................. 285/360–361, 376, 401, 391
See application file for complete search history.

(56) References Cited

U.S. PATENT DOCUMENTS

| | | | |
|---|---|---|---|
| 3,922,009 | A | 11/1975 | Giebeler |
| 4,040,264 | A | 8/1977 | Neilon |
| 4,043,575 | A | 8/1977 | Roth |
| 4,097,069 | A | 6/1978 | Morrill |
| 4,280,719 | A | 7/1981 | Daniel et al. |
| 4,330,140 | A | 5/1982 | Hampton |
| 4,487,434 | A | 12/1984 | Roche |
| 5,634,671 | A | 6/1997 | Watkins |
| 5,992,893 | A | 11/1999 | Watkins |
| 6,401,825 | B1 | 6/2002 | Woodrow |
| 6,623,044 | B1 | 9/2003 | Guesnon et al. |
| 6,991,038 | B2 | 1/2006 | Guesnon et al. |
| 8,474,540 | B2 | 7/2013 | Guesnon et al. |
| 8,561,706 | B2 | 10/2013 | Averbuch et al. |
| 8,616,286 | B2 | 12/2013 | Papon et al. |
| 8,733,452 | B2 | 5/2014 | Guesnon et al. |
| 2001/0048225 | A1 | 12/2001 | Andre et al. |
| 2005/0206163 | A1 | 9/2005 | Guesnon et al. |
| 2009/0166043 | A1 | 7/2009 | Poirette et al. |
| 2010/0164223 | A1 | 7/2010 | Curtiss, III et al. |
| 2010/0270025 | A1 | 10/2010 | Larson et al. |
| 2010/0300699 | A1 | 12/2010 | Papon et al. |
| 2011/0017466 | A1 | 1/2011 | Averbuch et al. |
| 2011/0073315 | A1 | 3/2011 | Guesnon et al. |
| 2011/0203804 | A1 | 8/2011 | Guesnon et al. |
| 2012/0325335 | A1 | 12/2012 | Schalkx |
| 2013/0020087 | A1* | 1/2013 | Guesnon ............... E21B 17/085 166/367 |
| 2013/0140813 | A1 | 6/2013 | Pallini, Jr. et al. |
| 2014/0159361 | A1 | 6/2014 | Weir et al. |

FOREIGN PATENT DOCUMENTS

| | | |
|---|---|---|
| CN | 103132927 A | 6/2013 |
| GB | 2 027 150 | 2/1980 |
| GB | 2 320 541 A | 6/1998 |
| GB | 2 356 435 A | 5/2001 |
| JP | 52-149841 A | 12/1977 |
| WO | WO 2011/078661 A1 | 6/2011 |
| WO | WO 2011/104629 A1 | 9/2011 |
| WO | WO 2013/022541 A2 | 2/2013 |
| WO | WO 2015/169560 A1 | 11/2015 |

\* cited by examiner

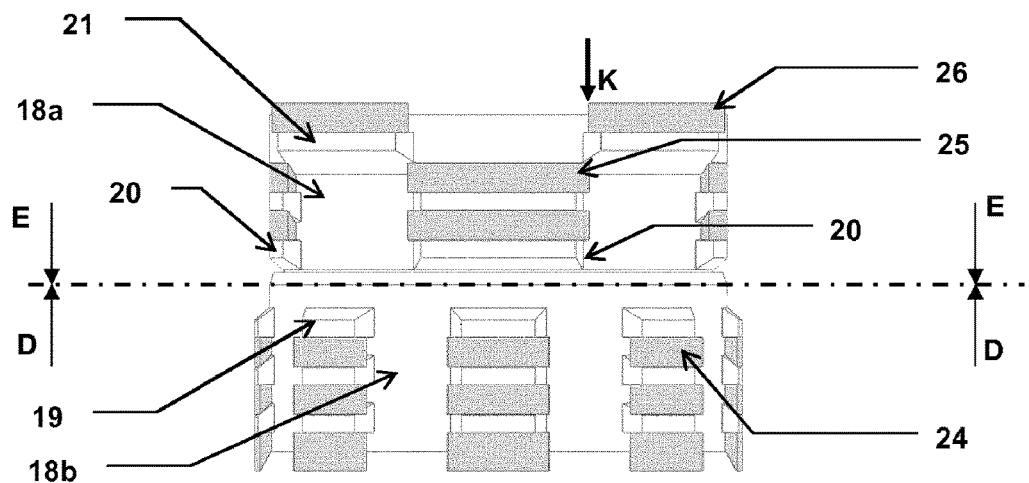
Fig. 11a
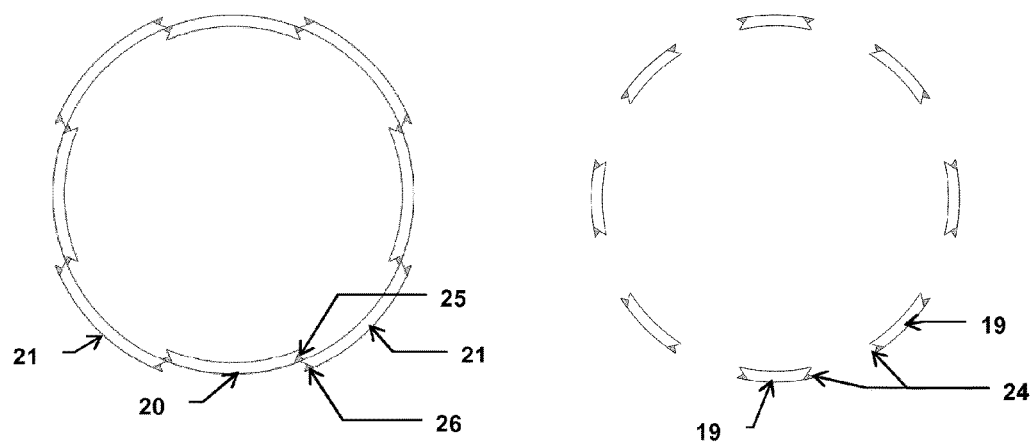
Fig. 11b  Fig. 11c

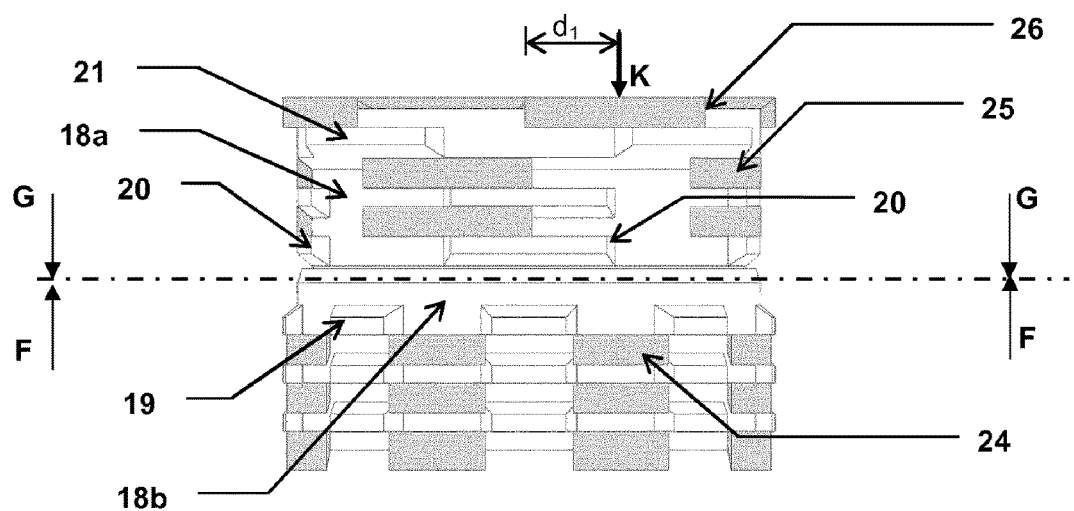
Fig. 12a
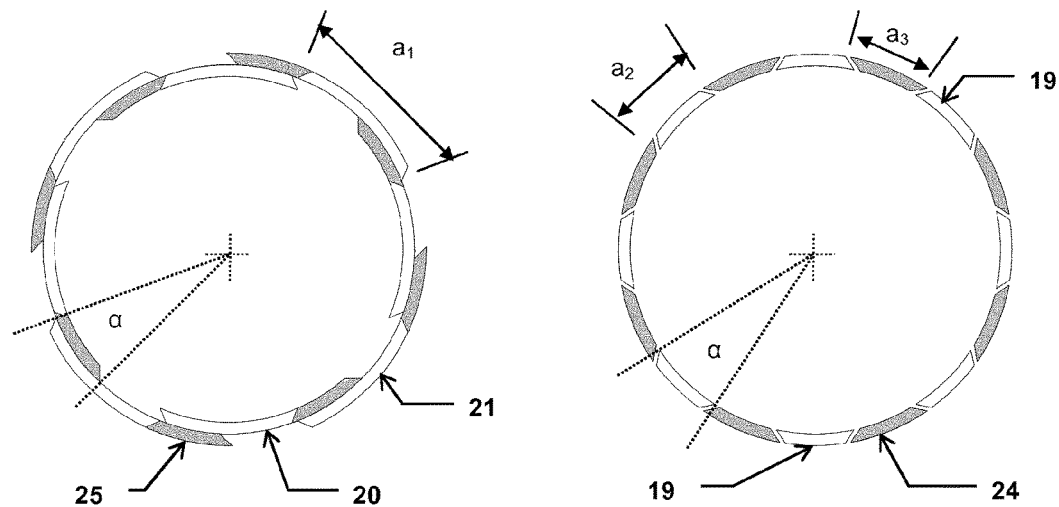
Fig. 12b  Fig. 12c

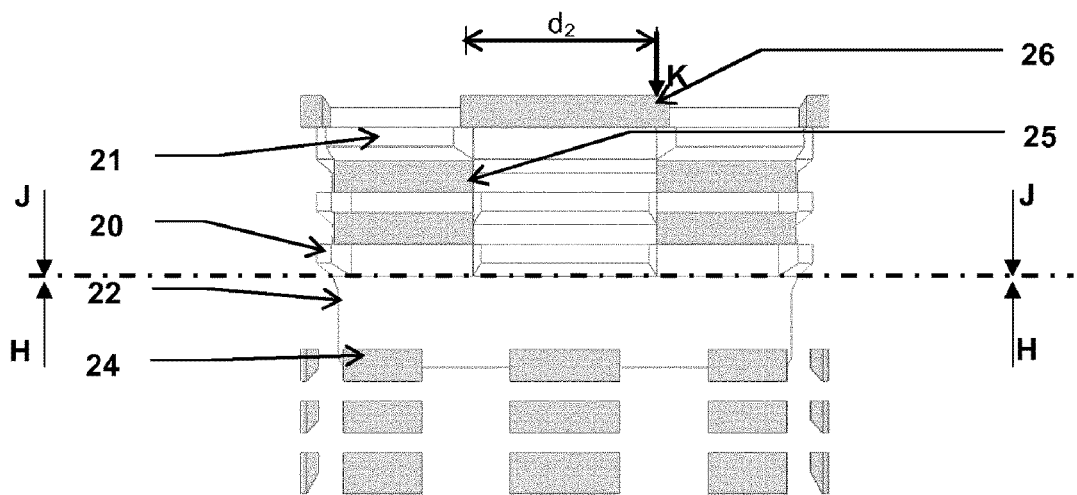
Fig. 13a
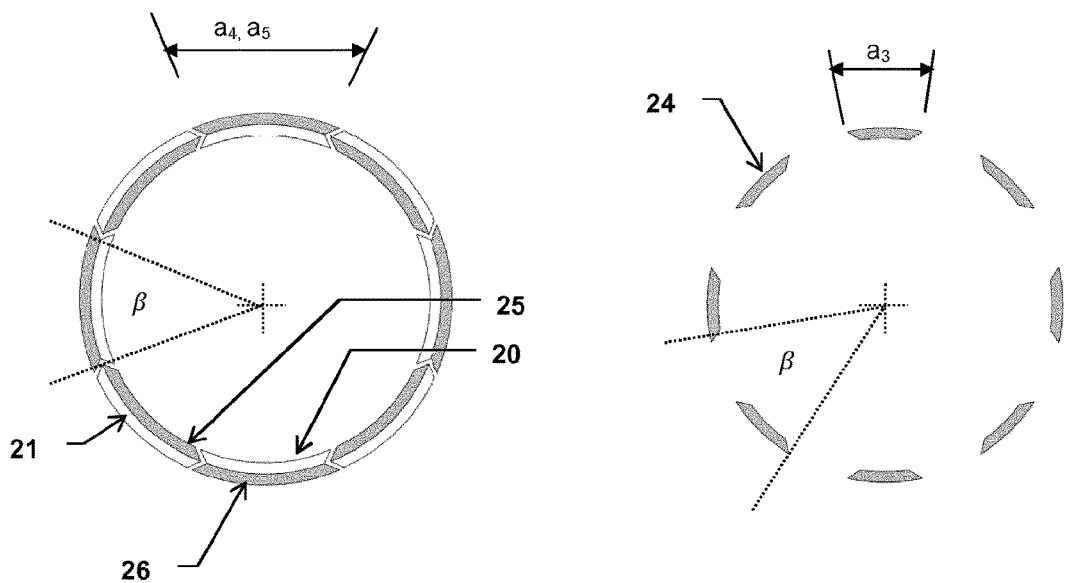
Fig. 13b    Fig. 13c

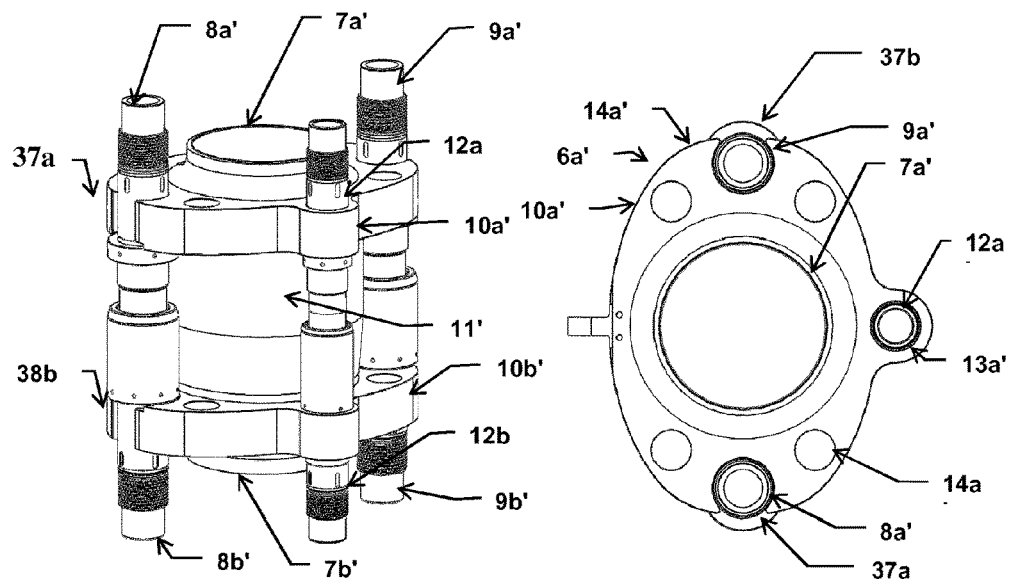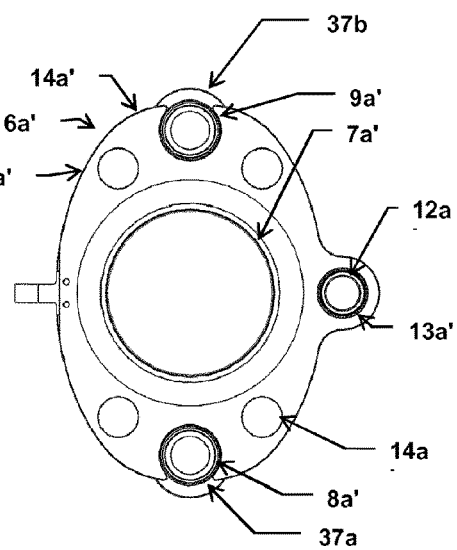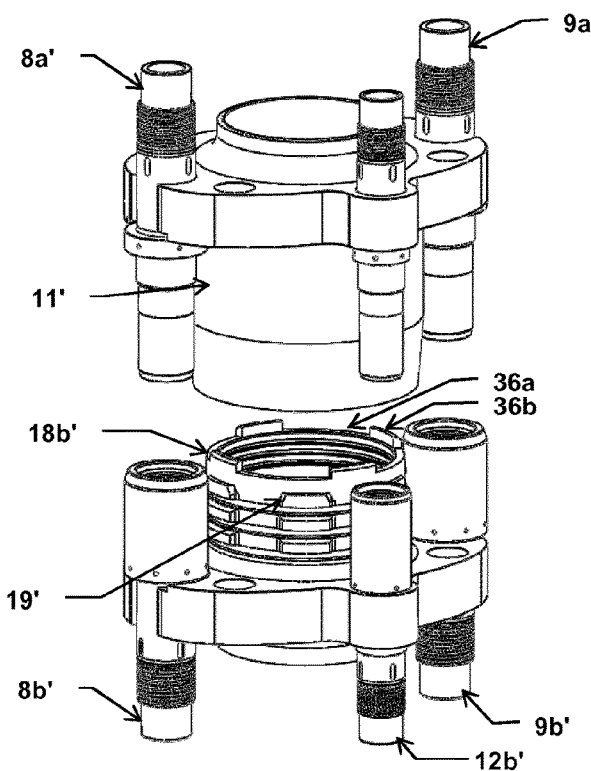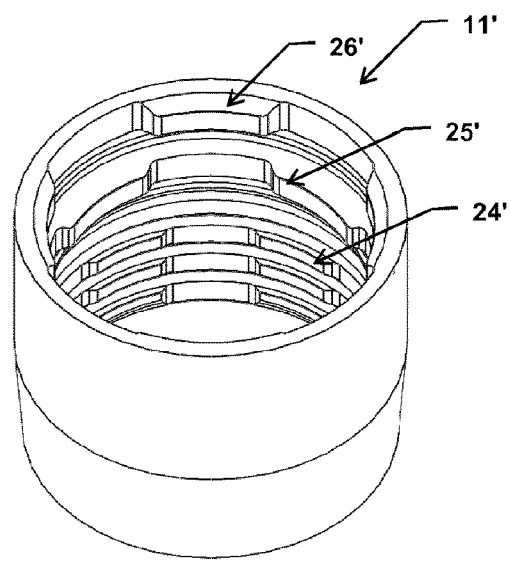
Fig. 17    Fig. 18
Fig. 19    Fig. 20

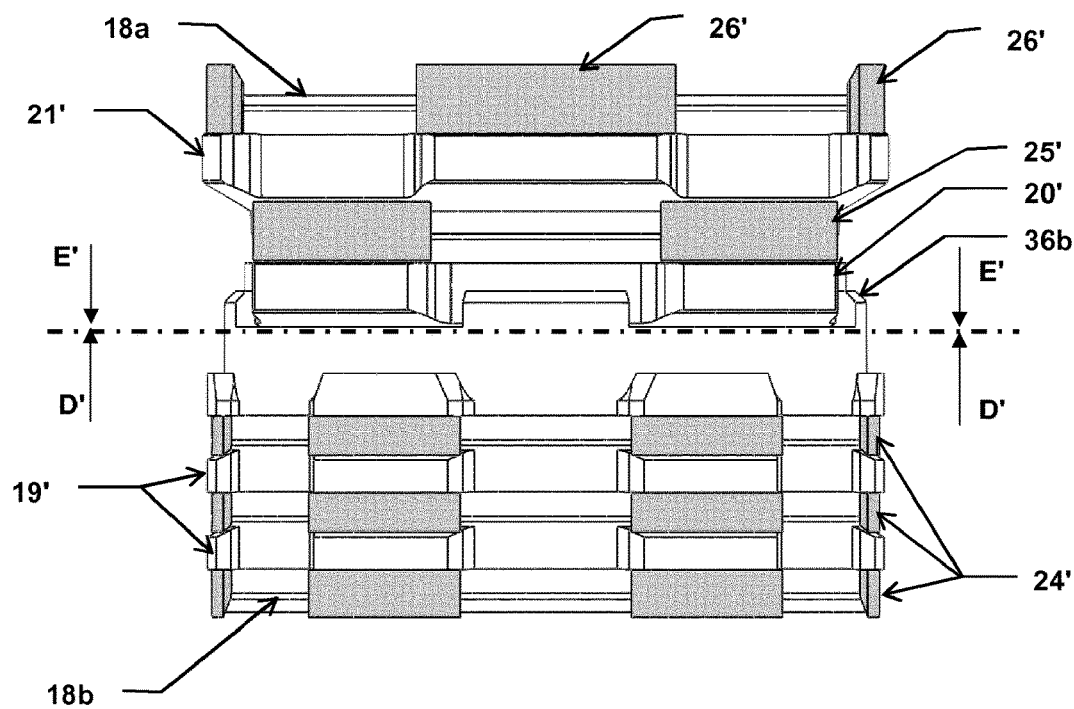
Fig. 22a
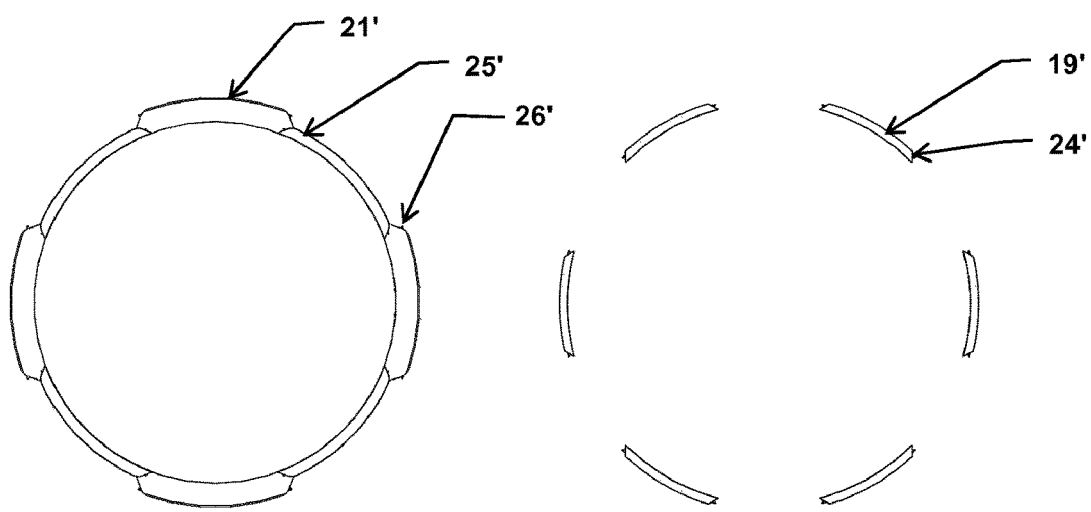
Fig. 22b  Fig. 22c

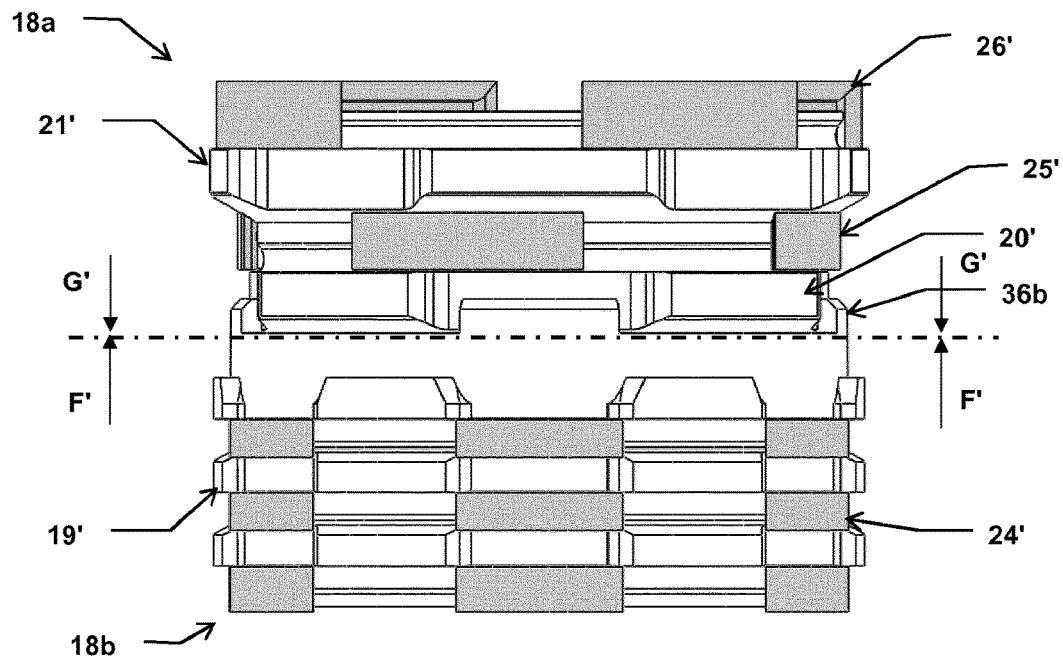
Fig. 23a
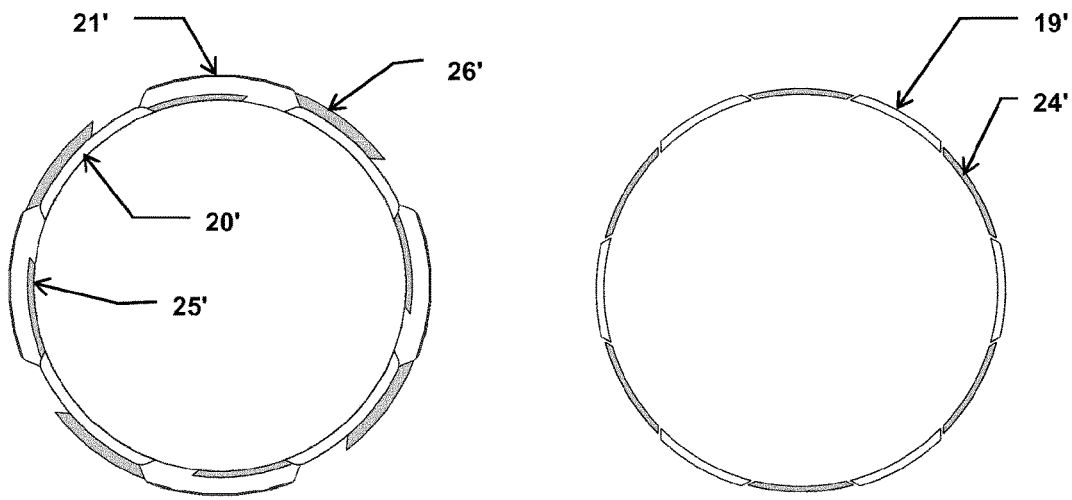
Fig. 23b  Fig. 23c

RISER CONNECTOR ASSEMBLY

CROSS REFERENCE TO PRIOR APPLICATIONS

This application is a U.S. National Phase application under 35 U.S.C. § 371 of International Application No. PCT/EP2014/074604, filed on Nov. 14, 2014 and which claims benefit to Norwegian Patent Application No. 20131518, filed on Nov. 15, 2013. The International Application was published in English on May 21, 2015 as WO 2015/071411 A2 under PCT Article 21(2).

FIELD

The present invention relates to connectors for releasably connecting riser pipes in an end-to-end relationship.

BACKGROUND

Production of hydrocarbons from subterranean reservoirs below a seabed has previously been described. In such operations, a floating drilling or/and production vessel is positioned above a subsea wellhead, and a riser extends between the vessel and the wellhead. Over the years, technological advances have made it possible to extract hydrocarbons from subsea reservoirs at ever increasing water depths; operations at water depths exceeding 3000 meters is not uncommon today.

A drilling riser comprises a number of successive sections (often referred to as "riser joints") whose adjacent ends are connected on board the vessel as the riser is being lowered towards the wellhead. A riser joint is typically made up of a main pipe and external auxiliary lines, all of which have connectors at each respective end. The main pipe is configured to convey drilling fluid, while auxiliary lines referred to as "kill and choke lines" are used to circulate fluids between the drilling vessel and a blow-out preventer (BOP) on the subsea wellhead, in a manner which is known in the art.

When operating in water depths of around 3000 meters and beyond, the riser mass (that the floating vessel must support) is considerable. Drilling operators and oil companies are therefore always looking for ways to reduce the size and weight of the riser joint components. Because some of the auxiliary lines (notably the kill and choke lines) convey fluids that are under considerable pressure, their wall thicknesses must, however, have a certain magnitude. It is therefore of particular interest to design the riser connector so that the loads caused by the main pipe and the auxiliary lines are transferred between the riser joints in an efficient manner, while the connector mass is optimized.

The prior art includes U.S. Pat. No. 4,043,575 which describes a connector for use between two riser pipes having a pin fitting at the end of one pipe. The pin fitting forms a portion of the connector. An end sleeve on the pin fitting has a cylindrical exterior surface and a first peripheral flange with upper and lower normal surfaces. A box fitting is at the end of the other pipe and has an end box with a cylindrical inner surface engaging the cylindrical exterior surface of the pin fitting. A second peripheral flange on the box fitting has upper and lower normal surfaces and is adapted to abut the first flange. An annular nut is rotatable about the flanges and has interior threads engageable with exterior threads on a collar rotatable around the box fitting and abutting the second flange. An inturned, interrupted nut flange on the nut overlies the first flange, which is also interrupted. The nut flange and the first flange can be relatively rotated to pass each other axially or to prevent such an axial movement. The nut and collar can be held in any of several relatively rotated positions by a bolt and slot connection, and the collar is held by a bolt against turning on the box fitting. Both fittings carry adjustable support rings for auxiliary pipes.

The prior art also includes GB 2 320 541 which describes a riser connector having respective tubular members connected to adjacent ends of riser pipes in an end-to-end relation and having locking grooves about their adjacent ends locked by a split lock ring surrounding the adjacent ends of the tubular members. A support plate extends laterally from each tubular member, mounting pipes (which may be choke and/or kill lines) to sealably interfit with one another upon movement of the tubular members into an end-to-end relation. The pipes are directly locked to one another to prevent vertical separation independently of locking of the tubular members in an end-to-end relation. The locking is by transverse bolts operated by levers. The lock ring is moved between locking and unlocking positions via a cam ring having tapered conical cam surfaces thereabout for slidable engagement with follower surfaces about the lock ring.

The prior art also includes U.S. Pat. No. 4,487,434 which describes a coupling for riser pipe sections and associated parallel choke and kill line pipe sections, where one riser pipe section is inserted in a second riser pipe section. One of the riser pipe sections includes a threaded male end which has at least two sets of continuous threads. A female union box carried on the other riser section includes at least two sets of continuous threads interengaged with the sets of threads on the male end, the respective sets of threads being axially and radially spaced from each other, the union box engaging the other riser pipe section to prevent the sections from moving axially relative to each other. The sections are provided with a fluid tight seal and choke and kill line sections are also penetratingly joined and supported by the riser pipe sections.

The prior art also includes U.S. Pat. No. 5,992,893 which describes a riser connector wherein an upper plate is carried by an upper riser member and a lower riser plate is carried by a lower riser member of an upper connector, and upper and lower riser plates and are similarly carried by the upper and lower riser members of the second connector. The plates extend outwardly from the riser members so as to support conduits connected to the ends of the auxiliary line joints which extend along the sides of the riser pipes. The lower end of an upper conduit of the upper connector is thus supported by the upper plate of the upper connector, while the upper end of the lower conduit thereof is supported by the plate of the upper connector.

The prior art also includes WO 2011/104629 which describes a connector for assembling two riser pipe sections for offshore well drilling operations. The connector comprises a first main tube element having as an extension a male connector element provided with a male flange pierced by at least one orifice wherein an auxiliary tube element is secured, and a second main tube element having as an extension a female connector element provided with a female flange pierced by at least one orifice wherein a second auxiliary tube element is secured. The male connector element fits into the female connector element so as to connect the two main tube elements and the two auxiliary tube elements. A locking ring assembles the male flange and the female flange, the locking ring being mounted mobile in rotation on the outer surface of the male flange, and the locking ring cooperating with the outer surfaces of the male and female flanges. The locking ring can be locked in translation by an axial shoulder provided on the male flange, and the ring can be provided with tenons that cooperate with the tenons arranged on the outer surface of the female flange.

The prior art also includes U.S. Pat. No. 4,280,719 which describes a connector having two interfitting tubular elements and a locking ring with at least two staggered rows of locking lugs cooperating with corresponding locking lugs of one of the tubular elements. The locking lugs are inscribed in cylindrical surfaces having different radii, so that when the ring is inserted on the element, its lugs slide on the lugs of the first lug row of the element to a position where the lugs of each lug row of the ring can pass between those of a corresponding row of the element to form a plurality of bayonet couplings which can then be simultaneously locked.

SUMMARY

In an embodiment, the present invention provides a riser connector assembly for connecting a first riser section to a second riser section in an end-to-end relationship, the first riser section comprising an upper main tubular element and the second riser section comprising a lower main tubular element. The riser connector assembly includes a first connector assembly portion comprising first locking members, the first connector assembly portion being attached to an end of the first riser section, a second connector assembly portion comprising second locking members, the second connector assembly portion being attached to an end of the second riser section, and a locking device comprising third locking members and fourth locking members. The locking device is rotatably connected to the first connector assembly portion. The locking device is configured to rotate between a first position where each of the first locking members, the second locking members, the third locking members, and the fourth locking members are interlocked, a second position where the first locking members and the third locking members are interlocked, and the second locking members and the fourth locking members are not interlocked, and a third position where none of the first locking members, the second locking members, the third locking members, and the fourth locking members are interlocked, so that the locking device is movable in an axial direction of each of the first riser section and the second riser section and is removable from the first connector assembly portion. The first locking members and the third locking members are configured and arranged to selectively and releasably interlock via a relative rotation between the first connector assembly portion and the locking device. The second locking members and the fourth locking members are configured and arranged to selectively and releasably interlock via a relative rotation between the second connector assembly portion and the locking device.

BRIEF DESCRIPTION OF THE DRAWINGS

The present invention is described in greater detail below on the basis of embodiments and of the drawings in which:

FIG. 11a shows a schematic illustration of the male and female connectors in a connected state and shows the lugs of the locking ring in a locked state;

FIG. 11b shows a sectional drawing along the section line D-D in FIG. 11a;

FIG. 11c shows a sectional drawing along the section line E-E in FIG. 11a;

FIG. 12a shows an illustration similar to that of FIG. 11a, but where the locking ring has been rotated to a position where the lugs of the locking ring are in an unlocked state (whereby the male and female connectors may be disconnected) but the locking ring remains connected to the male (upper) connector;

FIG. 12b shows a sectional drawing along the section line F-F in FIG. 12a;

FIG. 12c shows a sectional drawing along the section line G-G in FIG. 12a;

FIG. 13a shows an illustration similar to that of FIG. 12a, but where the female (lower) connector element has been removed, and the locking ring has been rotated to a position where the lugs of the locking ring are not engaging the lugs of the male connector, so that the locking ring may be removed from the male connector;

FIG. 13b shows a sectional drawing along the section line H-H in FIG. 13a;

FIG. 13c shows a sectional drawing along the section line J-J in FIG. 13a;

FIG. 17 shows a perspective view of a second embodiment of the connector assembly according to the present invention, illustrating the connector assembly in a connected and in a locked state (the full lengths of the pipes and lines of the riser joints are not shown);

FIG. 18 shows a top view of the connector assembly illustrated in FIG. 17;

FIG. 19 shows a perspective view of the connector assembly illustrated in FIG. 17, illustrating the connector assembly in a disconnected state;

FIG. 20 shows a perspective view of a second embodiment of the locking ring according to the present invention which is also shown in FIGS. 17 and 19;

FIG. 22a shows a schematic illustration of the second embodiment male and female connectors in a connected state and shows the lugs of the locking ring in a locked state;

FIG. 22b shows a sectional drawing along the section line D'-D' in FIG. 22a;

FIG. 22c shows a sectional drawing along the section line E'-E' in FIG. 22a;

FIG. 23a shows an illustration similar to that of FIG. 22a, but where the locking ring has been rotated to a position where the lugs of the locking ring are in an unlocked state (whereby the male and female connectors may be disconnected) but the locking ring remains connected to the male (upper) connector;

FIG. 23b shows a sectional drawing along the section line F'-F' in FIG. 23a;

FIG. 23c shows a sectional drawing along the section line G'-G' in FIG. 23a;

DETAILED DESCRIPTION

Figure 1:
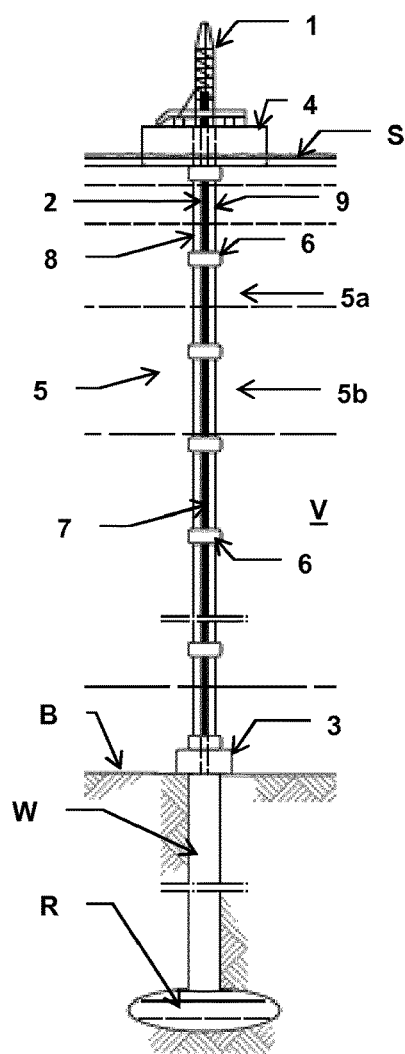
FIG. 1 shows schematic illustration of a floating vessel suspending a tubular using a plurality of the connector assemblies according to the present invention.

In an embodiment, the present invention provides a riser connector assembly to connect two riser sections in an end-to-end relationship, each riser section comprising at least a respective main tubular element, the connector assembly comprising:

a first connector assembly portion attached to an end of the first riser section and having a plurality of first locking members;

a second connector assembly portion attached to an end of the second riser section and having a plurality of second locking members; and a locking device rotatably connected to the first connector assembly portion and comprising third locking members and fourth locking members, and wherein the first locking members and the third locking members are configured and arranged to selectively and releasably interlock by relative rotation between the first connector assembly portion and the locking device, the second locking members and the fourth locking members are configured and arranged to selectively and releasably interlock by relative rotation between the second connector assembly portion and the locking device, characterized in that, the locking device is rotatable between a first position where all the locking members are interlocked, a second position where the first locking members and the third locking members are interlocked, but the second locking members and the fourth locking members not interlocked, and a third position where none of the locking members are interlocked, and the locking device is movable in the axial direction of the riser sections and hence removable from the first connector assembly portion.

In an embodiment of the present invention, the locking device can, for example, comprise a ring member, and the first locking members can, for example, comprise lugs arranged on an outer peripheral surface of a male connector, and the second locking members can, for example, comprise lugs arranged on an outer peripheral surface of a female connector, and the third and fourth locking members can, for example, comprise lugs arranged on an inner surface of the locking device.

In an embodiment of the present invention, each connector assembly portion can, for example, comprise at least one respective auxiliary tubular element, the tubular elements in each connector assembly portion being connected to a flange, and the first flange can, for example, comprise a male connector and the second flange can, for example, comprise a female connector, the male and female connectors being fluidly connected to a respective main tubular element.

In an embodiment of the present invention, at least one of the assembly portions can, for example, comprise an alignment device that is operable between a guiding state and a non-guiding state.

In an embodiment of the present invention, a first alignment device can, for example, be arranged on the rotatable locking device and be configured to cooperate with at least a second alignment device on the first or second flange.

In an embodiment of the present invention, the second alignment device, can, for example, be fixedly connected to its respective flange.

In an embodiment of the present invention, the locking device can, for example, comprise a unitary body.

In an embodiment of the present invention, the alignment device can, for example, comprise one or more contact areas that are configured for sliding contact with an external guide structure.

In the connector assembly of the present invention, the locking ring grooves provide guiding during mating and reduces the center-to-center distance between the main pipe and the auxiliary lines. It can also be advantageous if the non-circular flange shape optimizes weight and stiffness of the connector assembly, as only the lines that contribute to the transfer of tension loads are structurally included in the connector flanges. Other lines may be attached to the flanges via hang-off brackets. The configuration of the lugs on the male and female connectors and on the locking ring allows the locking ring to be removed from the connector without having to spit the locking ring. The non-circular flange geometry, in combination with the inventive spider guide structure, provides for an efficient, safe and accurate mating of successive riser joints.

The connector assembly and associated spider guide structure of the present invention therefore provide certain benefits over the prior art in terms of reliability, HSE aspect, and weight optimization. The connector assembly of the present invention is lighter that most comparable connector assemblies using locking rings.

The present invention also provides a method of disconnecting two riser sections that are connected in an end-to-end relationship via respective first and second connector assembly portions, in the inventive riser connector assembly, the method characterized by the steps of:
  a) causing a relative rotation between the locking device and the first and second connector assembly portions, from the first position to the second position;
  b) removing the second connector assembly portion from the locking device;
  c) causing a relative rotation between the locking device and the first connector assembly portion, from the second position to the third position; and
  d) removing the locking device from the first connector assembly portion.

In an embodiment of the above method of disconnecting, step d) can, for example, comprise moving the locking device in an axial direction with respect to the riser sections.

The present invention also provides a method of connecting two riser sections in an end-to-end relationship via respective first and second connector assembly portions, in the inventive riser connector assembly, the method characterized by the steps of:
  a) moving the locking device onto the first connector assembly portion by relative axial movement between the locking device and the first connector assembly portion when the locking device is in the third position;
  b) causing a relative rotation between the locking device and the first connector assembly portion, from the third position to the second position;
  c) moving the second connector assembly portion at least partially into the locking device; and
  d) causing a relative rotation between the locking device and at least the second connector assembly portion, from the second position to the first position.

In an embodiment of the method of disconnecting or of the method of connecting, the relative rotation is caused by rotating the locking device.

These and other characteristics of the present invention will become clear from the following description of an embodiment, which is provided as a non-restrictive example, with reference to the attached schematic drawings.

The description may use terms such as "horizontal", "vertical", "lateral", "back and forth", "up and down", "upper", "lower", "inner", "outer", "forward", "rear", "above", "below", etc. These terms generally refer to the views and orientations as shown in the drawings and that are associated with a normal use of the invention. The terms are used for the reader's convenience only and shall not be limiting. In the following description, the term "axial" shall be understood as referring to the longitudinal direction of the riser connector assembly, as indicated by the axial centreline $C_L$ in FIG. 3. The term "radial" shall be understood as referring to the radial extension of the components being described, i.e., any plane perpendicular to the centreline $C_L$.

FIG. 1 illustrates a floating drilling vessel 4 suspending a drilling riser 2 by a derrick 1. The riser 2 extends from the vessel 4, through a body of water V, and connects to a wellhead 3, normally comprising a blow-out preventer (BOP; not shown). The riser 2 thus forms a conduit between the vessel 4 and a well W, which in turn connects with a reservoir R. The riser 2 is made up by a number of successive sections 5 (often referred to as "riser joints") whose adjacent ends are connected on board the vessel 4 as the riser 2 is being lowered towards the wellhead 3. Each riser joint 5 comprises a main pipe 7 and external auxiliary lines 8, 9. The riser joints 5 are connected in an end-to-end relationship by connector assemblies 6. The main pipe 7 is configured for conveying drilling fluids and well fluids, while the auxiliary lines 8, 9 in the illustrated embodiment are so-called "kill and choke lines", respectively. Other auxiliary lines (not shown in FIG. 1), such as hydraulic lines or booster lines, are also normally connected to the riser joint. Kill and choke lines generally differ from other auxiliary lines because they need to withstand high internal pressures and are consequently designed with relatively thick walls. The wall thicknesses of e.g., the booster line and the hydraulic line, on the other hand, need not be particularly large, as these lines are designed to be operated under comparably lower pressures.

Each riser joint 5 may conveniently be provided with one or more buoyancy modules (not shown).

A first embodiment of the riser connector assembly will now be described with reference to FIGS. 2 to 13c.

Figures 5, 6:
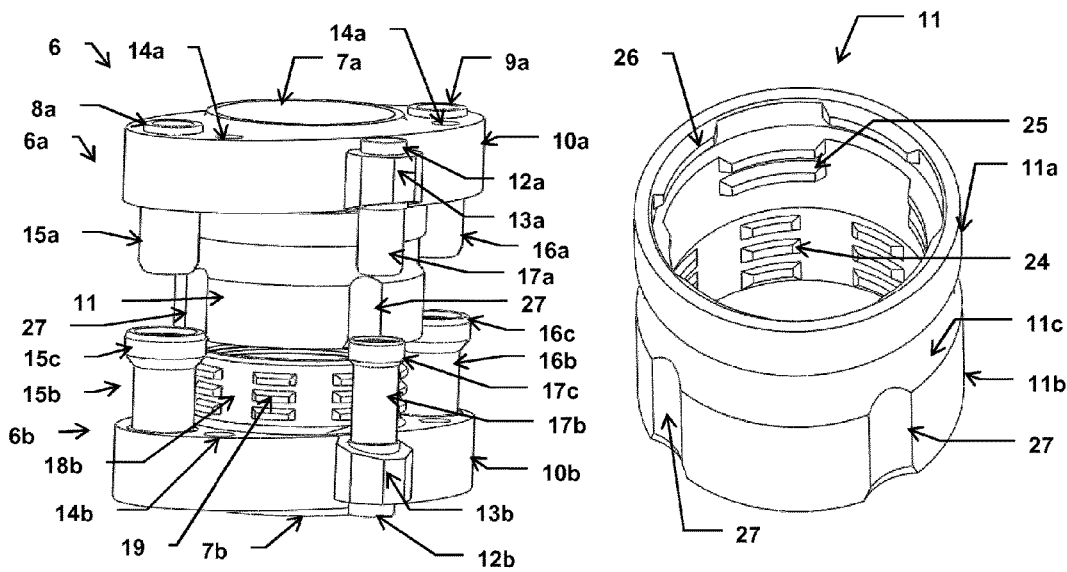
FIG. 5 shows a perspective view of the connector assembly illustrated in FIG. 3, illustrating the connector assembly in a disconnected state.
FIG. 6 shows a perspective view of an embodiment of the locking ring according to the present invention.

Referring now to FIG. 5, which illustrates a connector assembly 6 in a disconnected state, the connector assembly 6 comprises an upper assembly portion 6a, a lower assembly portion 6b, and a locking ring 11. The upper assembly portion 6a forms the lower end of a riser joint 5a and the lower assembly portion 6b forms the upper end of a riser joint 5b (arranged as illustrated in FIG. 1). It should be understood that the full lengths of the pipes and lines of the riser joints 5 are not shown in FIG. 5, but only the portions being attached to the connector assembly 6. The locking ring 11 is rotatably and removably attached to the upper assembly portion 6a in a manner which will be described below.

The upper assembly portion 6a comprises an upper flange 10a to which is connected an upper main pipe 7a, an upper kill line 8a and an upper choke line 9a. An upper booster line 12a is also connected to the upper flange 10a, via an external hang-off bracket 13a. The upper flange 10a also comprises through-going bores 14a that may be used for other auxiliary lines (e.g., hydraulic lines; not shown). The upper kill line 8a and the upper choke line 9a extend through the upper flange 10a to respective male connecting elements 15a, 16a, and the upper booster line 12a also terminates in a male connecting element 17a.

The lower connector assembly portion 6b comprises a lower flange 10b (having a shape similar to that of the upper flange 10a) to which is connected a lower main pipe 7b and lower kill and choke lines (not shown in FIG. 5). A lower booster line 12b is also connected to the lower flange 10b, via an external hang-off bracket 13b. The lower flange 10b also comprises through-going bores 14b that may be used for other auxiliary lines (not shown). The lower kill and choke lines (not shown in FIG. 5) extend through the lower flange 10b to respective female connecting elements 15b, 16b, and the lower booster line 12b also terminates in a female connecting element 17b. The upper and lower flanges 10a,b may be welded to, or be formed integrally with, their respective main pipes 7a,b.

The kill line, choke line and booster line are connected via the respective male and female connecting elements in a manner which is known in the art (e.g., pin/box couplings), and will therefore not be described in more detail here.

The lower main pipe 7b extends through the lower flange 10b to an annular female connector 18b, having a plurality of external lugs 19 arranged at regular intervals around the connector periphery as well as in an axial direction. The illustrated embodiment shows three circumferential rows of female connector lugs 19, the lugs within each circumferential row being arranged at regular intervals around the connector periphery.

Figure 10:
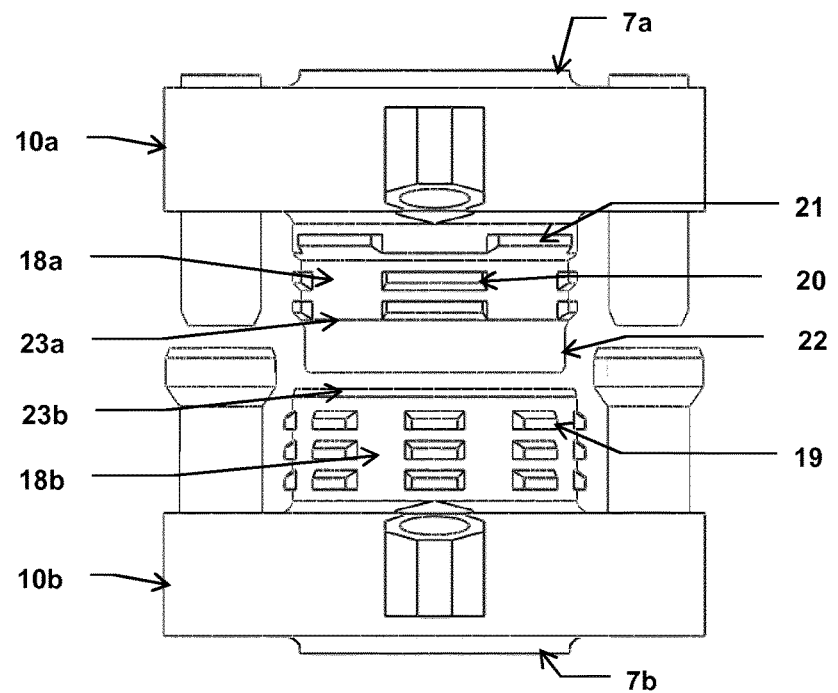
FIG. 10 shows a side view of the connector assembly according to the present invention in a disconnected state (similar to the illustrations of FIGS. 5 and 9), but where the locking ring and one auxiliary line have been removed for illustration purposes.

FIG. 10 shows the connector assembly in a disconnected state (similar to that of FIG. 5), but the locking ring 11 and the booster line have been removed in FIG. 10, thereby exposing an annular male connector 18a which is attached to the upper flange 10a and forming the end portion of the upper main pipe 7a. The male connector 18a comprises at its lower end a reduced diameter portion 22, designed and configured to be accommodated within the female connector 18b, and a shoulder 23a that is configured to rest against a corresponding rim 23b on the female connector 18b. The male connector 18a comprises a plurality of external lugs 20 arranged at regular intervals around the male connector periphery as well as in an axial direction. The illustrated embodiment shows two circumferential rows of male connector lugs 20, the lugs within each circumferential row arranged at regular intervals around the connector periphery. The male connector 18a also comprises a plurality of external upper lugs 21 arranged at regular intervals around the male connector periphery. The upper and lower flanges 10a,b may be welded to, or be formed integrally with, their respective male and female connectors 18a,b.

Referring now to FIG. 6, the locking ring 11 comprises an upper portion 11a and a lower portion 11b, each portion being internally configured and dimensioned to receive the male and female connectors 18a,b, respectively. It is readily apparent from FIG. 6 that the upper portion 11a external diameter is smaller than the lower portion 11b external diameter, and that the outer surfaces of the upper and lower portions are joined by a bevelled surface portion 11c A row of internal upper lugs 26 are arranged at regular intervals around the upper portion 11a inner periphery. A plurality of internal intermediate lugs 25 are arranged at regular intervals around the upper portion 11a inner periphery, as well as in an axial direction, below the upper lugs 26. The illustrated embodiment shows two circumferential rows of intermediate lugs 25, the lugs within each row arranged at regular intervals around the locking ring inner periphery. A plurality of internal lower lugs 24 are arranged at regular intervals around the lower portion 11b inner periphery as well as in an axial direction. The illustrated embodiment shows three circumferential rows of lower lugs 24, the lugs within each row arranged at regular intervals around the locking ring inner periphery.

The outer surface of the locking ring lower portion 11b also comprises grooves 27 that each are arranged and configured to at least partially accommodate a respective enlarged portion 15c, 16c, 17c of each female connecting element 15b, 16b, 17b when the locking ring 11 is in an unlocked position (see e.g., FIG. 5). The grooves 27 thus provide guiding during the mating of the upper and lower connector assemblies 6a,b. The grooves 27 also serve to reduce the distance between the main pipe 7 and the auxiliary lines 8, 9 in each riser joint 5, thereby reducing the bending moments caused by loads transferred through the auxiliary lines 8, 9 and into the respective flange.

Referring again to FIG. 5, this figure illustrates a disconnected state of the connector assembly. However, FIG. 5 illustrates a state where the upper and lower connector assemblies 6a,b are quite close (e.g., immediately prior to mating or after separation), so that the grooves 27 in fact are guiding the enlarged portions 15c, 16c, 17c of the female connecting elements 15b, 16b, 17b.

Figures 3, 4:
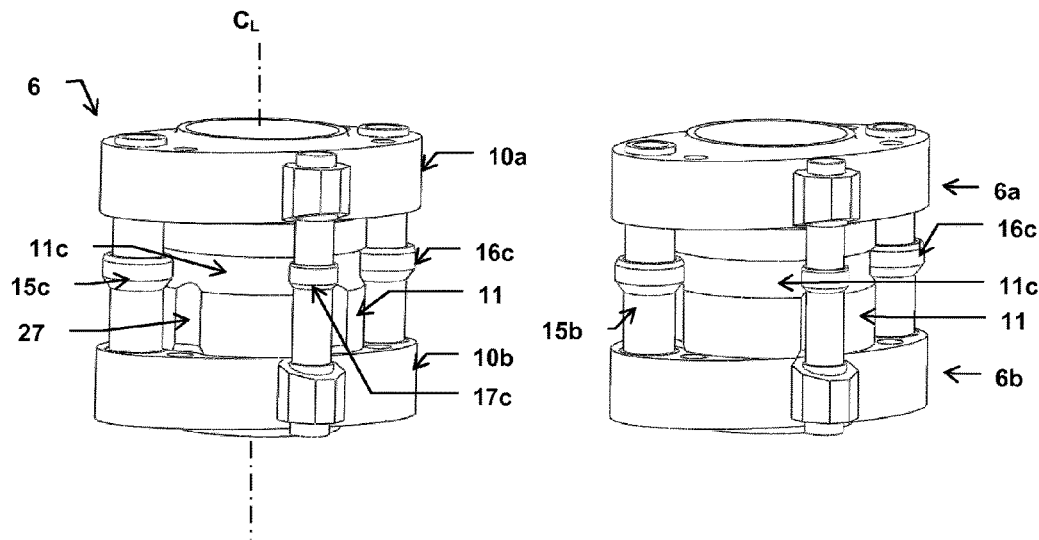
FIG. 3 shows a perspective view of an embodiment of the connector assembly according to the present invention, illustrating the connector assembly in a connected and in a locked state (the full lengths of the pipes and lines of the riser joints are not shown)
FIG. 4 shows a perspective view of the connector assembly illustrated in FIG. 3, illustrating the connector assembly in a connected and in an unlocked state.

FIG. 4 illustrates the connector assembly in a fully mated (connected) condition, but the locking ring 11 is in the unlocked state.

FIG. 3 illustrates the connector assembly in a connected and locked state, where, compared to the illustration of FIG. 4, the locking ring 11 has been rotated counter-clockwise so that the grooves 27 are not aligned with the female connecting elements. In fact, in this position of the locking ring 11, the enlarged portions 15c, 16c, 17c are prevented from moving in the axial direction by the bevelled surface portion 11c.

Figure 2:
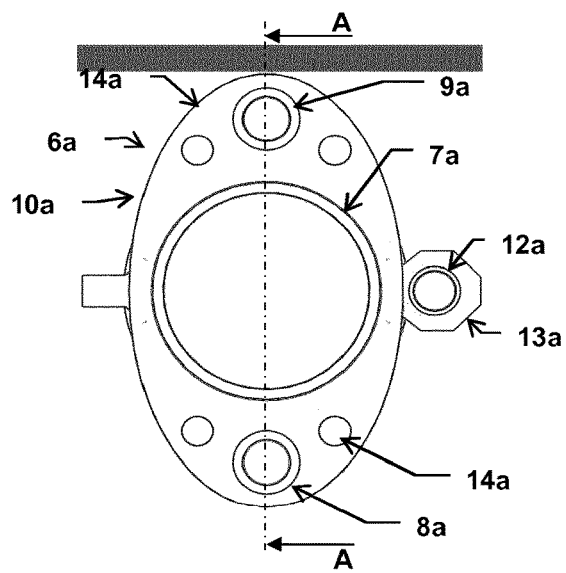
FIG. 2 shows a top view of the connector assembly illustrated in FIG. 3.
Figure 7:
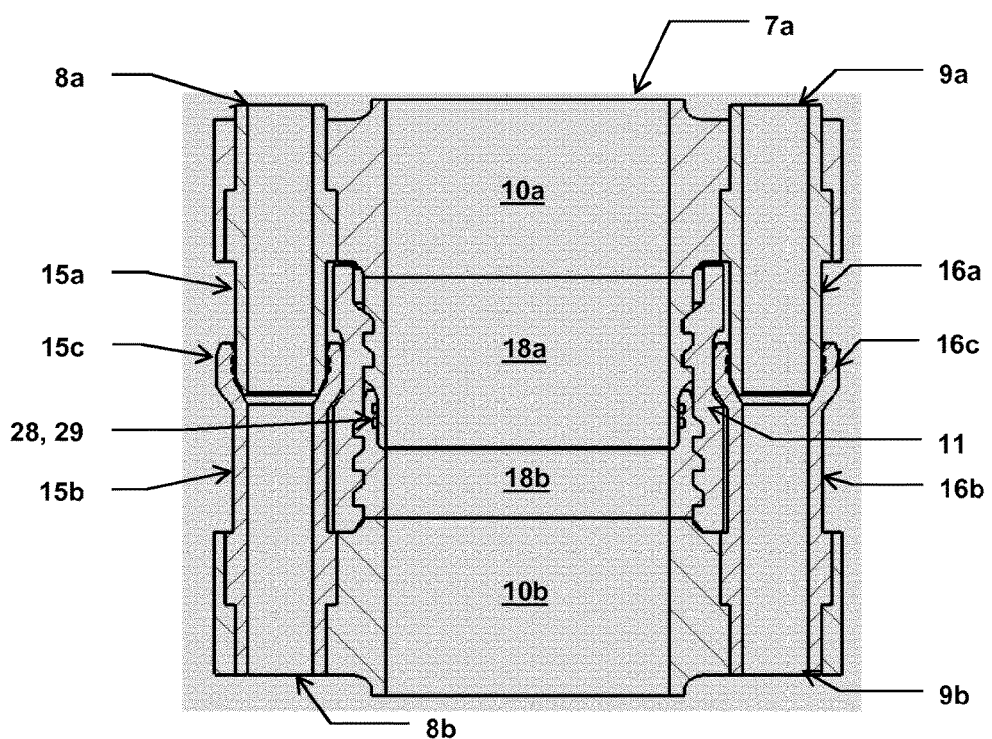
FIG. 7 shows a sectional view along the section line A-A in FIG. 2, illustrating the connector assembly in a connected and in a locked state (corresponding to FIG. 3)
Figure 8:
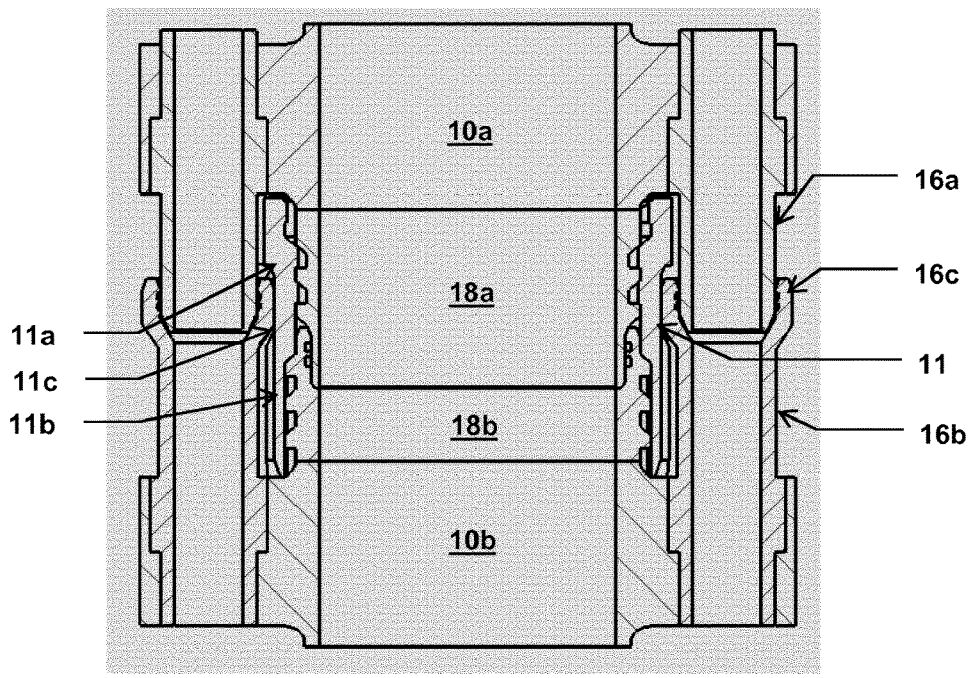
FIG. 8 shows a sectional view along the section line A-A in FIG. 2, illustrating the connector assembly in a connected and in an unlocked state (corresponding to FIG. 4)
Figure 9:
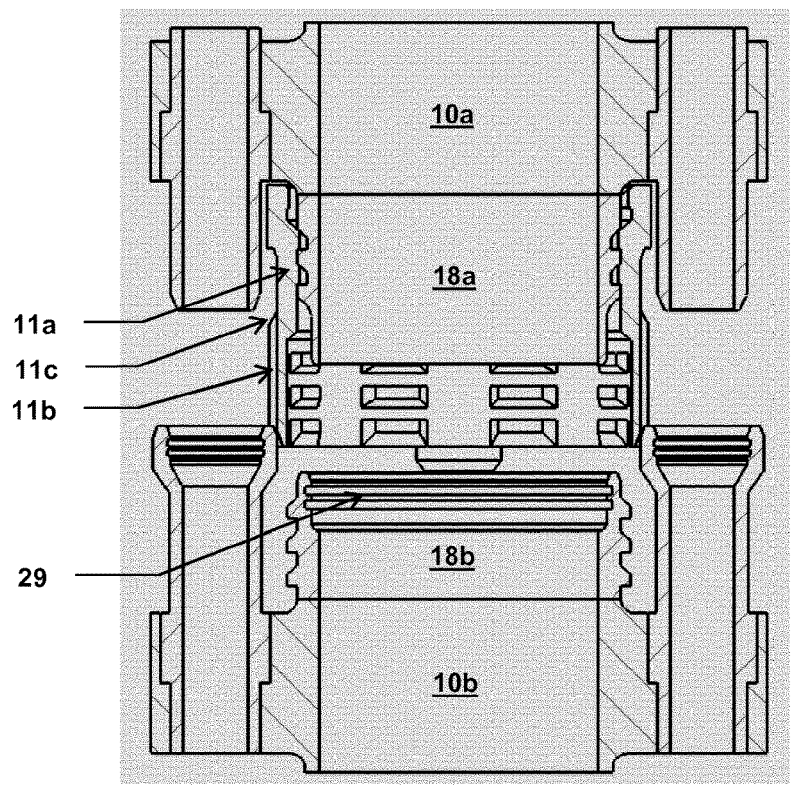
FIG. 9 shows a sectional view along the section line A-A in FIG. 2, illustrating the connector assembly in a disconnected state (corresponding to FIG. 5)

FIGS. 7, 8 and 9 are sectional views along the section line A-A in FIG. 2 and correspond to the states illustrated by FIGS. 3, 4 and 5, respectively. These figures, and in particular FIG. 9, illustrate how seal rings 29 are arranged in seal grooves 28 on the internal wall of the female connector 18b. The seal rings are therefore not exposed to the locking ring lugs during mating, and the risk of damaging the seals during mating is reduced.

In FIGS. 11a-c the male and female connectors 18a,b are shown in connected state and locked by locking ring lugs 24, 25, 26. The locking ring body is not shown in FIGS. 11a, 12a, 13a, only its lugs. FIGS. 11b,c, 12b,c, 13b,c only show the lugs, not the bodies to which they are connected. FIGS. 11a-c shows how the locking ring upper lugs 26 abut against respective male connector upper lugs 21, the locking ring intermediate lugs 25 abut against respective male connector lower lugs 20, and the locking ring lower lugs 24 abut against respective female connector lugs 19.

In FIGS. 12a-c, which represent the connected-and-unlocked state, the locking ring has been rotated an angle $\alpha$ (an arc length $d_1$ with respect to reference mark K on the male connector 18a) to a position where the locking ring lower lugs 24 do not abut against female connector lugs 19 but are arranged in respective spaces between adjacent female connector lugs 19 (see FIG. 12c). In this state, the locking ring 11 therefore does not support the female connector 18b, which thus may be withdrawn from the male connector and the locking ring. The locking ring upper lugs 26 are still supported by respective portions of male connector upper lugs 21, and the locking ring intermediate lugs 25 are still supported by respective portions of male connector lower lugs 20 (see FIGS. 12a,b), whereby the locking ring 11 still attached to the male connector.

In FIGS. 13a-c, the female connector has been removed (as it is not supported by the locking ring 11, compare FIG. 12c) and the locking ring 11 has been rotated further, an angle $\beta$ (an angular distance $d_2$ with respect to reference mark K), to a position where the locking ring upper lugs 26 are not supported by respective male connector upper lugs 21, but are arranged in respective spaces between adjacent male connector upper lugs 21, and the locking ring intermediate lugs 25 are not supported by respective male connector lower lugs 20, but are arranged in respective spaces between adjacent male connector lower lugs 20 (see FIG. 13b).

FIG. 13b (and FIGS. 11b, 12b) illustrates how the locking ring upper lugs 26 are arranged on a portion of the locking ring 11 that has a greater diameter than the portion of the male connector where the male connector lower lugs 20 are arranged. The locking ring intermediate lugs 25 are also arranged on a portion of the locking ring that has a smaller diameter than the portion of the male connector where the upper lugs 21 are arranged. The locking ring 11 may therefore be removed from the male connector without being impeded by any of the lugs on the male connector. It is apparent from FIGS. 12a-c and 13a-c that the arc length $d_2$ is twice the distance $d_1$ and that $\beta=2\alpha$. In one embodiment, $\beta=45°$ and $\alpha=22.5°$.

As is evident from e.g., FIG. 12c, the locking ring lower lugs 24 have arc lengths $a_3$, that are slightly less than the arc length $a_2$ between adjacent female connector lugs 19 that are in the same row of lugs, so that the female connector may be removed from the locking ring when the locking ring 11 is in the position shown in FIGS. 12a-c.

As is evident from e.g., FIG. 13b, the locking ring upper and intermediate lugs 26, 25 have arc lengths $a_5$, $a_4$ that are slightly less than the arc length $a_1$ between adjacent male connector lugs 20, 21 (see FIG. 12b) that are in the same row of lugs, so that the locking ring 11 may be removed from the male connector when the locking ring 11 is in the position shown in FIG. 13a,b.

Referring to FIG. 7, the skilled person will understand that the axial tensions in the main pipe 7a and the kill and choke lines 8a, 9a of the upper riser joint 5a are transferred by the connector assembly to the main pipe 7,b and the kill and choke lines 8b, 9b of the lower riser joint 5b. The tension loads are taken in both the main pipes and the kill and choke lines, utilising well known principles and techniques.

As is clearly shown in FIGS. 2 to 5, the upper and lower flanges 10a,b have elliptical shapes, which optimizes weight and stiffness of the connector assembly. Only the lines that contribute to the transfer of tension loads (main pipe, kill and choke lines) are structurally included in the connector flanges. Other, thin-walled lines such as booster lines are simply attached to the flanges via hang-off brackets.

Figure 14:
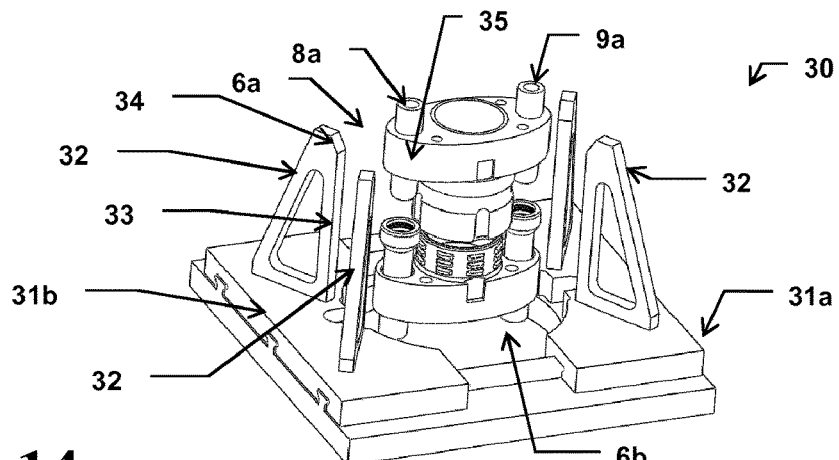
FIG. 14 shows a perspective view of an embodiment of a riser spider according to the present invention in an open state, in combination with an embodiment of the connector assembly according to the present invention in a disconnected state.
Figure 15:
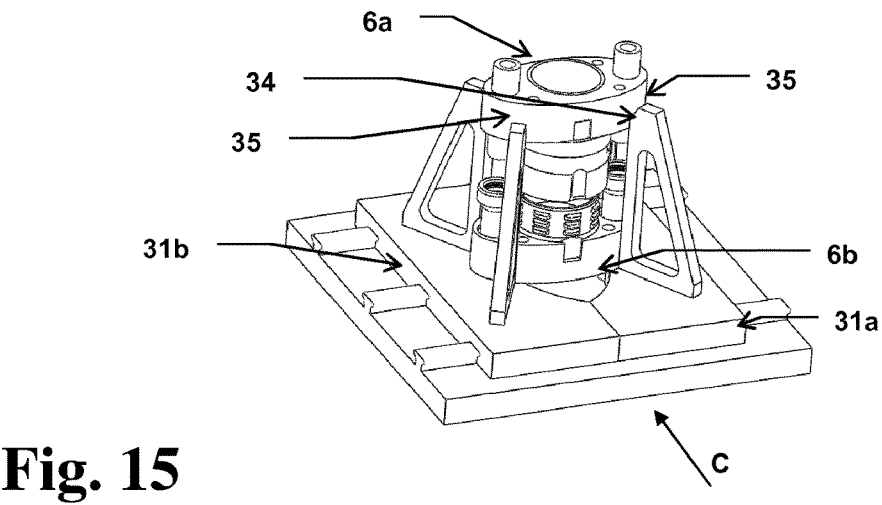
FIG. 15 shows a perspective view of the riser spider illustrated in FIG. 14 in a closed state, in combination with an embodiment of the connector assembly according to the present invention in a disconnected state.
Figure 16:
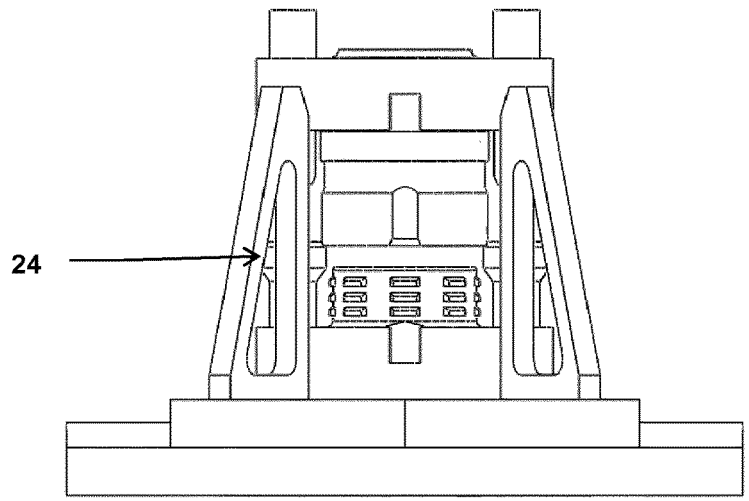
FIG. 16 shows a front view (in the direction of arrow B) of the riser spider and connector assembly illustrated in FIG. 15.

FIGS. 14, 15 and 16 illustrate the invented connector assembly in use during the mating of two successive riser joints (not shown). A spider 30, which per se is known in the art, comprises movable support plates 31a,b that may be slid back and forth to selectively support (FIGS. 15, 16) and release (FIG. 14) the connector assemblies 6a,b (and thus the riser joints to which they are connected).

In FIG. 15, the lower connector assembly 6b is being supported by the spider plates 31a,b (being in the closed positions) and thus support the riser joints (not shown) underneath. An upper riser joint (not shown) having the upper connector assembly 6a at its lower end is about to be mated with the lower connector assembly 6b. Guide structures 32 provide that the connector assemblies 6a,b are aligned before the mating process commences. As shown also in FIG. 14, a bevelled region 34 at the upper portion of each guide structure interacts with a respective contact area 35 on the flange, thereby providing a preliminary alignment prior to mating, while a linear guide portion 33 provides alignment when the connector assemblies are being mated. Thus, by virtue of the non-circular shape of the flanges 10a,b and the arrangement of the contact areas 35 so that they initially abut against the bevelled region 34 and then against the linear guide portion 33, alignment of the two connector assembly portions 6a,b is provided during the mating and connection operation.

A second embodiment of the riser connector assembly will now be described with reference to FIGS. 17 to 24e. It should be understood that first and second embodiments are similar, except for the features described in the following.

FIG. 17 and FIG. 18 show that the booster lines 12a,b are integrated in the respective flanges 10a', 10b' (and not supported by a hang-off bracket as in the first embodiment). The figures also show that the flanges 10a', 10b' do not fully enclose the choke and kill lines 8a', 8b', 9a', 9b', but each have a respective open segment 37a,b, 38a,b. This is advantageous in order to reduce overall weight and fabrication costs for the flanges.

FIG. 17 also shows that the locking ring 11' has a smooth outer surface (e.g., without the alignment groove 27 shown in FIG. 3). It should be noted that lock pins, etc., that are generally known in the art, are not shown.

Referring to FIG. 19, the female connector 18b' comprises in this second embodiment three rows of spaced apart lugs 19' and a series of castellations 36a,b at the female connector upper rim. The castellations 36a,b are formed by successive notches 36a and lips 36b.

FIG. 20 shows the internal lugs of the locking ring 11'. It should be noted that in this second embodiment, the locking ring 11' comprises one row of upper lugs 26' and one row of intermediate lugs 25'. As will be described below (e.g., FIG. 21), the locking ring upper lugs 26' are configured to interact with corresponding male connector upper lugs 21', and the locking ring intermediate lugs 25' are configured to interact with corresponding male connector lower lugs 20'.

Figure 21:
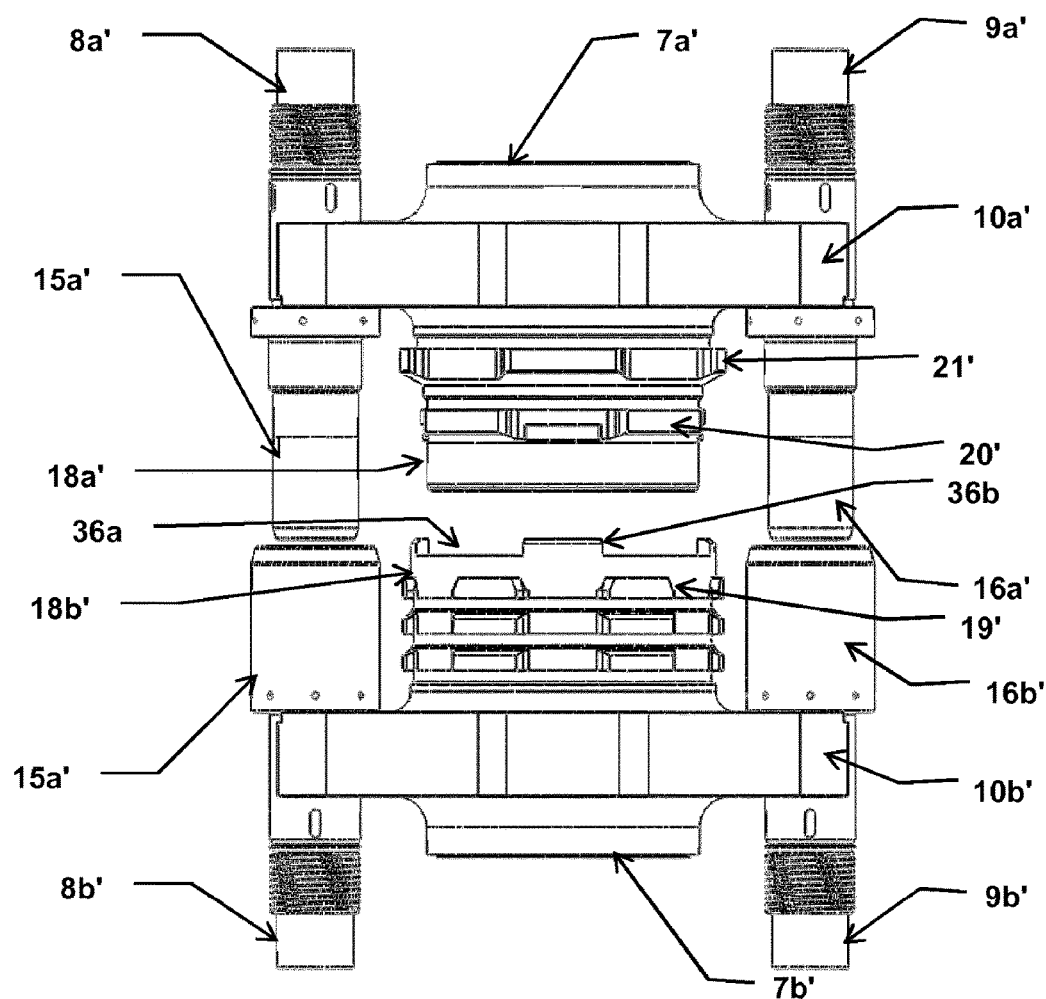
FIG. 21 shows a side view of the second embodiment of the connector assembly according to the present invention in a disconnected state (similar to the state shown in FIG. 19), but where the locking ring and one auxiliary line have been removed for illustration purposes.

In FIG. 21, the locking ring has been removed in order to illustrate the lugs of the male connector 18a'. In this second embodiment, the male connector 18a' comprises one row of upper lugs 21' and one row of lower lugs 20'. FIG. 21 shows the castellations 36a,b on the female connector 18b' and how the lips 36b are dimensioned to fit between adjacent male connector lower lugs 20'. This interaction prevents radial movement between the male connector and the female connector and thus prevents twisting forces in the coupling to taken up by the peripheral lines (e.g., choke, kill and auxiliary lines).

In FIGS. 22a-c, the male and female connectors 18a',b' are shown in a connected state and locked by locking ring lugs 24', 25', 26'. The locking ring body is not shown in FIGS. 22a, 23a, 24a, 24d,c, only its lugs. FIGS. 22b,c, 23b,c, 24b,e only show the lugs, not the bodies to which they are connected.

FIGS. 22a-c shows how the locking ring upper lugs 26' abut against respective male connector upper lugs 21', the locking ring intermediate lugs 25' abut against respective male connector lower lugs 20', and the locking ring lower lugs 24' abut against respective female connector lugs 19'. If one considers that, in FIG. 22a, the male connector is above the female connector and thus carries the weight of the riser joint to which the female connector is attached, it is apparent that male connector lugs 20', 21' in fact provide support for respective locking ring intermediate and upper lugs 25', 26', and that the locking ring lower lugs 24' provide support for the female connector lugs 19'. In FIG. 22b, the locking ring upper lugs 26' are barely visible.

It is also apparent from FIGS. 22b,c that in this second embodiment, each circumferential row of lugs comprises six lugs circumferentially spaced around the female connector and locking ring periphery, i.e., with an angular spacing of 30°, while each row of lugs on the male connector comprises four circumferentially spaced lugs.

In FIGS. 23a-c, which represent the connected-and-unlocked state, the locking ring has been rotated to a position where the locking ring lower lugs 24' do not abut against female connector lugs 19' but are arranged in respective spaces between adjacent female connector lugs 19' (see FIG. 23c). In this state, the locking ring therefore does not support the female connector 18b', which thus may be withdrawn from the male connector and the locking ring. The locking ring upper lugs 26' are still supported by respective portions of male connector upper lugs 21', and the locking ring intermediate lugs 25' are still supported by respective portions of male connector lower lugs 20' (see FIGS. 23a,b), whereby the locking ring still attached to the male connector.

Figure 24A:
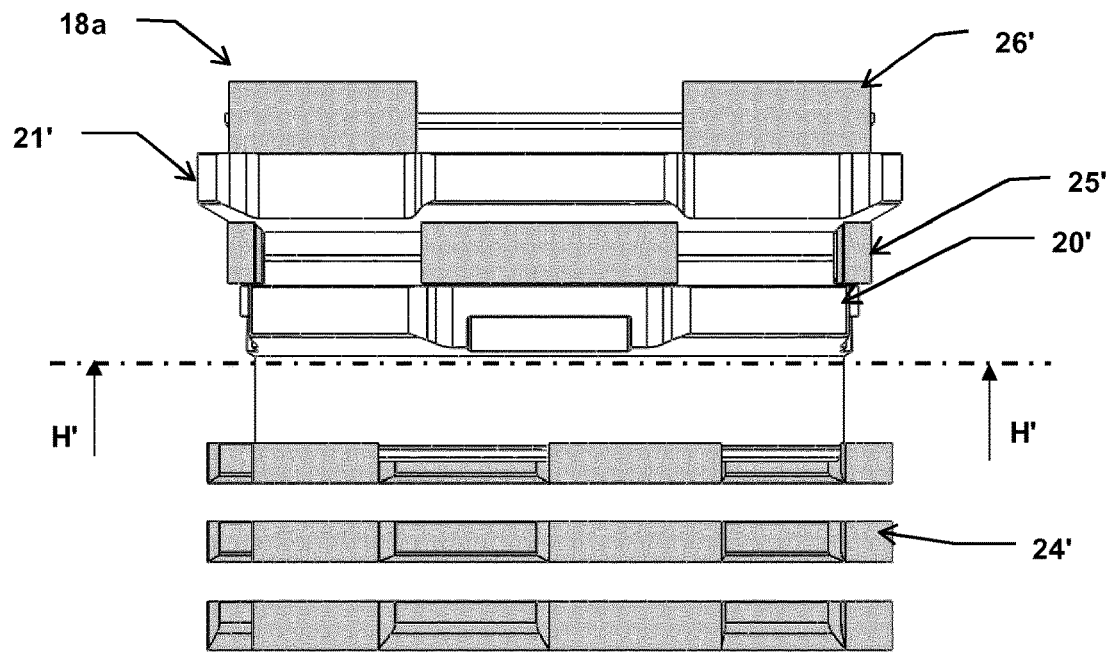
FIG. 24a shows an illustration similar to that of FIG. 23a, but where the female (lower) connector element has been removed, and the locking ring has been rotated to a position where the upper lugs of the locking ring are located between the upper lugs of the male connector.
Figure 24B:
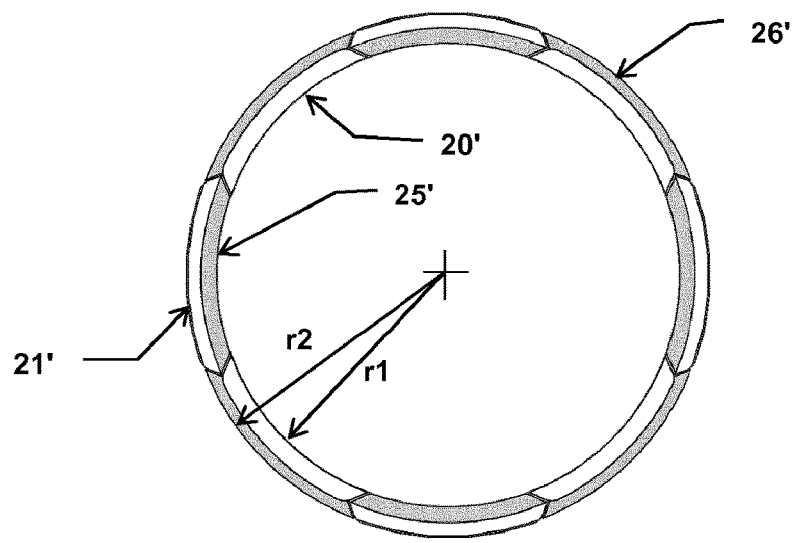
FIG. 24b shows a sectional drawing along the section line H'-H' in FIG. 24a and illustrates how the male connector lower lugs are positioned between the locking ring upper lugs, which prevent the locking ring from being removed as the locking ring upper lugs have a smaller internal radius than the outside radius of the male connector lower lugs.

In FIGS. 24a,b, the female connector has been removed, and the locking ring has been rotated further, to a position where the locking ring upper lugs 26' are located between the male connector upper lugs 21'. FIG. 24b shows in particular how the male connector lower lugs 20' are positioned between the locking ring upper lugs 26', thus preventing the locking ring from being removed. This is because the locking ring upper lugs 26' are arranged with an internal diameter r1 which is smaller than the outer diameter r2 of the male connector lower lugs 20'.

Figure 24C:
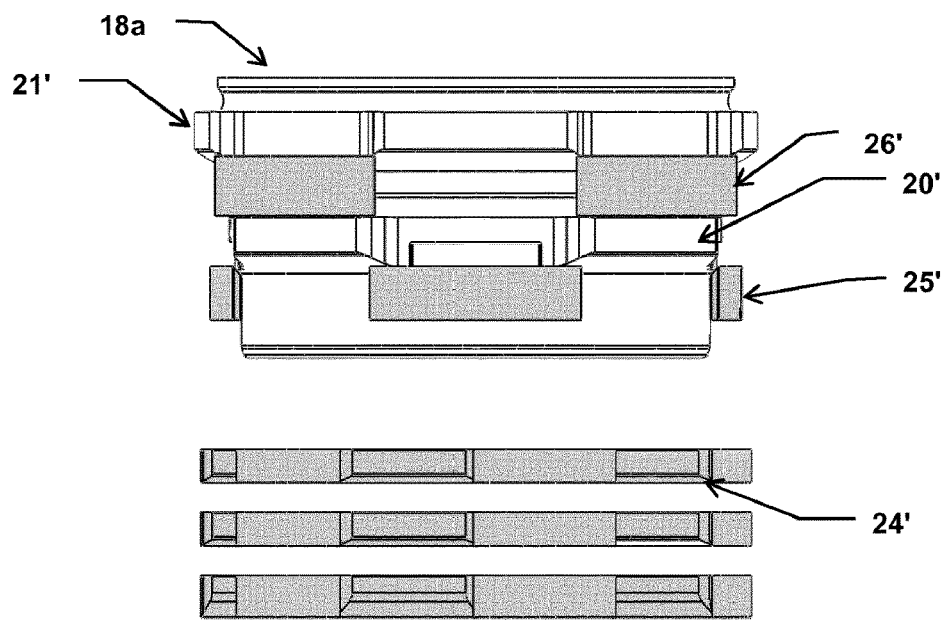
FIG. 24c shows an illustration similar to that of FIG. 24a, but where the locking ring has been lowered further so that the locking ring upper lugs are resting on the male connector lower lugs, and the locking ring intermediate lugs have been disengaged from the male connector.

In FIG. 24c, the locking ring has been lowered (downwards in FIG. 24c) until the locking ring upper lugs 26' are resting on the male connector lower lugs 20'. The locking ring intermediate lugs 25' are now free and disengaged from the male connector 18a.

Figure 24D:
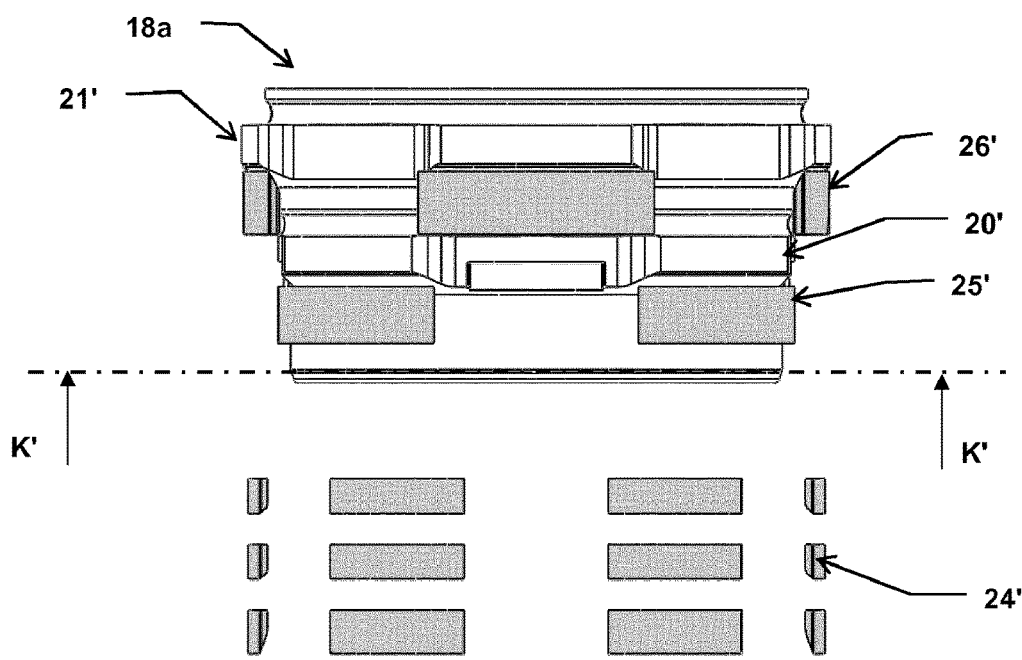
FIG. 24d shows an illustration similar to that of FIG. 24c, but where the locking ring has been rotated further, to a position where the locking ring upper lugs are located between the male connector lower lugs, whereby the locking ring may be removed from (or falls off) the male connector.
Figure 24E:
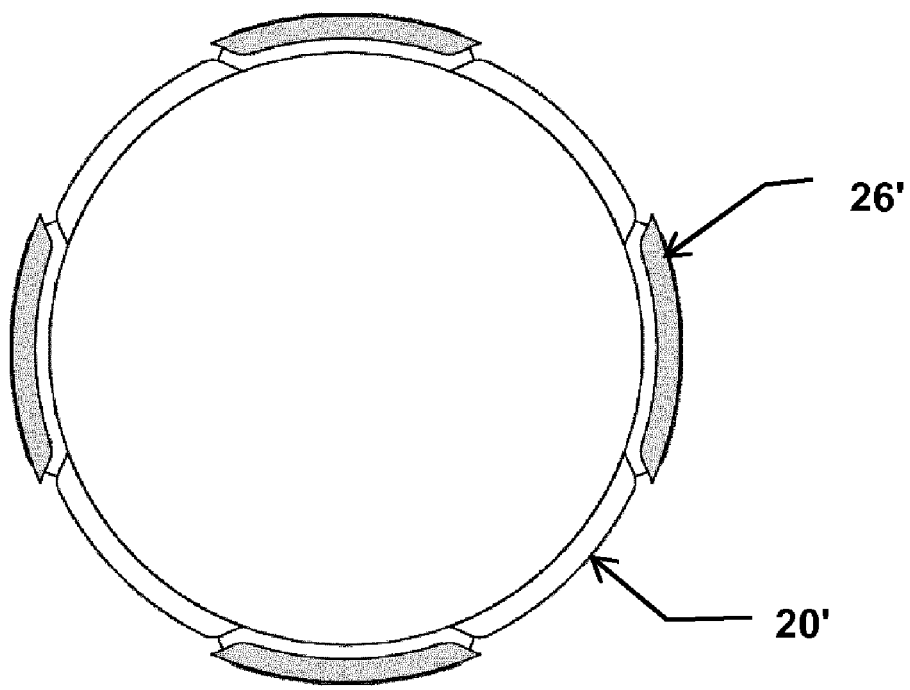
FIG. 24e shows a sectional drawing along the section line K'-K' in FIG. 24d.

In FIGS. 24d and 24e, the locking ring has been rotated further, compared to the position in FIG. 24c. The locking ring has now been rotated to a position where the locking ring upper lugs 26' are located between the male connector lower lugs 20', whereby the locking ring may be removed from the male connector. This two-step sequence for removing the locking ring from the male connector, as shown in FIG. 24c,d, is, for example, a safety measure in order to prevent the locking ring from accidentally falling off the male connector.

In both of the embodiments described above, the locking ring is connected to the male connector when the female connector has been removed. It should be understood that a reverse configuration is possible, i.e., that the locking is connected to the female connector after the male connector has been removed. It should also be understood that the invented connector assembly may be designed for either clockwise or counter clockwise rotation of the locking ring, without departing from the scope of the invention.

The present invention is not limited to embodiments described herein; reference should be had to the appended claims.

What is claimed is:

1. A riser connector assembly for connecting a first riser section to a second riser section in an end-to-end relationship, the first riser section comprising an upper main tubular element and the second riser section comprising a lower main tubular element, the riser connector assembly comprising:
    a first connector assembly portion comprising a first connector and first lugs arranged at regular intervals around a periphery of the first connector, the first connector assembly portion being attached to an end of the first riser section;
    a second connector assembly portion comprising a second connector and second lugs arranged at regular intervals around a periphery of the second connector, the second connector assembly portion being attached to an end of the second riser section; and
    a locking device comprising an inner periphery, third lugs arranged at regular intervals around an upper portion of the inner periphery, and fourth lugs arranged at regular intervals around a lower portion of the inner periphery, the locking device being rotatably and releasably connected to the first connector assembly portion, the locking device being configured to rotate between:
        a first position where the first lugs and the third lugs are interlocked, and the second lugs and the fourth lugs are interlocked,
        a second position where the first lugs and the third lugs are interlocked, and the second lugs and the fourth lugs are not interlocked, and
        a third position where none of the first lugs, the second lugs, the third lugs, and the fourth lugs are interlocked, so that the locking device is movable in an axial direction of each of the first riser section and the second riser section and is removable from the first connector assembly portion,
    wherein,
    the first lugs and the third lugs are configured and arranged to selectively and releasably interlock via a relative rotation between the first connector assembly portion and the locking device, and
    the second lugs and the fourth lugs are configured and arranged to selectively and releasably interlock via a relative rotation between the second connector assembly portion and the locking device.

2. The riser connector assembly as recited in claim 1, further comprising:
    a male connector; and
    a female connector,
    wherein,
    the male connector comprises the first lugs as lugs arranged on an outer peripheral surface of the male connector,
    the female connector comprises the second lugs as lugs arranged on an outer peripheral surface of the female connector, and
    the locking device is provided as a ring member, the locking device comprising the third lugs and the fourth lugs as respective lugs arranged on an inner surface of the locking device.

3. The riser connector assembly as recited in claim 1, wherein,
    the first connector assembly portion further comprises a first connector assembly portion auxiliary tubular element and a first connector assembly portion flange comprising the male connector, the first connector assembly portion auxiliary tubular element being connected to the first connector assembly portion flange, and the male connector being fluidly connected with the upper main tubular element, and
    the second connector assembly portion further comprises a second connector assembly portion auxiliary tubular element and a second connector assembly portion flange comprising the female connector, the second connector assembly portion auxiliary tubular element being connected to the second connector assembly portion flange, and the female connector being fluidly connected with the lower main tubular element.

4. The riser connector assembly as recited in claim 1, wherein the first connector assembly portion comprises a first alignment device and the second connector assembly portion comprises a second alignment device, the first alignment device comprising a shape which is configured to at least partly accommodate the second alignment device.

5. The riser connector assembly as recited in claim 4, wherein the second alignment device is fixedly connected to the second connector assembly portion flange.

6. The riser connector assembly as recited in claim 4, further comprising:
an external guide structure,
wherein,
at least one of the first alignment device and the second alignment device comprises at least one contact area which is configured to provide a sliding contact with the external guide structure.

7. The riser connector assembly as recited in claim 1, wherein the locking device is provided as a unitary body.

8. A method of disconnecting a first riser section from a second riser section which are connected to each other in an end-to-end relationship via the riser assembly as recited in claim 1, the method comprising:
providing a relative rotation between the locking device, the first connector assembly portion, and the second connector assembly portion, from the first position to the second position;
removing the second connector assembly portion from the locking device;
providing a relative rotation between the locking device and the first connector assembly portion, from the second position to the third position; and
removing the locking device from the first connector assembly portion.

9. The method as recited in claim 8, wherein the removal of the locking device from the first connector assembly portion comprises moving the locking device in an axial direction with respect to the first riser section and the second riser section.

10. The method as recited in claim 8, wherein each relative rotation is provided by rotating the locking device.

11. A method of connecting a first riser section from a second riser section which are connected to each other in an end-to-end relationship via the riser assembly as recited in claim 1, the method comprising:
moving the locking device onto the first connector assembly portion via a relative axial movement between the locking device and the first connector assembly portion when the locking device is in the third position;
providing a relative rotation between the locking device and the first connector assembly portion, from the third position to the second position;
moving the second connector assembly portion at least partially into the locking device; and
providing a relative rotation between the locking device and at least the second connector assembly portion, from the second position to the first position.

12. The method as recited in claim 11, wherein each relative rotation is provided by rotating the locking device.

13. A riser connector assembly for connecting a first riser section and a second riser section in an end-to-end relationship, the first riser section comprising an upper main tubular element and the second riser section comprising a lower main tubular element, the riser connector assembly comprising:
a first connector assembly portion attached to an end of the first riser section, the first connector assembly portion comprising first locking members, a first flange which comprises a male connector, at least one first auxiliary tubular element connected to the first flange, and at least one first auxiliary connector, each of the at least one first auxiliary connector being fluidically connected to a respective one of the at least one first auxiliary tubular element;
a second connector assembly portion attached to an end of the second riser section, the second connector assembly portion comprising second locking members, a second flange which comprises a female connector, at least one second auxiliary tubular element connected to the second flange, and at least one second auxiliary connector, each of the at least one second auxiliary connector being fluidically connected to a respective one of the at least one second auxiliary tubular element;
a locking ring comprising third locking members and fourth locking members, the locking ring being rotatably connected to the first connector assembly portion,
wherein,
the first locking members and the third locking members are configured and arranged to selectively and releasably interlock via a relative rotation between the first connector assembly portion and the locking ring,
the second locking members and the fourth locking members are configured and arranged to selectively and releasably interlock via a relative rotation between the second connector assembly portion and the locking ring,
the male connector of the first flange is fluidly connected to the upper main tubular element,
the female connector of the second flange is fluidly connected to the lower main tubular element, and
the locking ring is arranged between the male connector, the female connector, the at least one first auxiliary connector, and the at least one second auxiliary connector.

14. The riser connector assembly as recited in claim 13, wherein,
the first locking members comprise lugs arranged on an outer peripheral surface of the male connector,
the second locking members comprise lugs arranged on an outer peripheral surface of the female connector,
the third locking members comprise lugs arranged on an inner surface of the locking ring, and
the fourth locking members comprise lugs arranged on the inner surface of the locking ring.

15. The riser connector assembly as recited in claim 13, wherein the locking ring is configured to rotate between,
a first position where each of the first locking members, the second locking members, the third locking members, and the fourth locking members are interlocked,
a second position where the first locking members and the third locking members are interlocked, and the second locking members and the fourth locking members are not interlocked, and
a third position where none of the first locking members, the second locking members, the third locking members, and the fourth locking members are interlocked, so that the locking ring is movable in an axial direction of each of the first riser section and the second riser section and is removable from the first connector assembly portion.

16. The riser connector assembly as recited in claim 13, wherein at least one of the first connector assembly portion and the second connector assembly portion comprises an alignment device which is configured to be operable between a guiding state and a non-guiding state.

17. The riser connector assembly as recited in claim 16, wherein, the alignment device comprises a first alignment device arranged on the locking ring and a second alignment device arranged on the first flange or on the second flange, the first alignment device being configured to cooperate with the second alignment device.

18. The riser connector assembly as recited in claim 17, wherein the second alignment device is fixedly connected to the first flange or to the second flange.

19. The riser connector assembly as recited in claim 16, further comprising:
an external guide structure,
wherein,
the alignment device comprises at least one contact area which is configured to provide a sliding contact with the external guide structure.

20. The riser connector assembly as recited in claim 13, wherein the first flange and the second flange have a non-circular outline.

21. The riser connector assembly as recited in claim 13, wherein the first flange and the second flange have a substantially oval outline.

* * * * *